(12) United States Patent
Begleiter et al.

(10) Patent No.: US 9,475,477 B2
(45) Date of Patent: Oct. 25, 2016

(54) SYSTEM AND METHOD FOR REDUCING TRANSIENT BRAKE CALIPER DRAG

(71) Applicant: GM Global Technology Operations LLC, Detroit, MI (US)

(72) Inventors: David Begleiter, Toronto (CA); Steven J. Weber, Mount Clemens, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 58 days.

(21) Appl. No.: 13/666,656

(22) Filed: Nov. 1, 2012

(65) Prior Publication Data

US 2014/0116816 A1    May 1, 2014

(51) Int. Cl.
| | |
|---|---|
| *B60T 17/22* | (2006.01) |
| *B60T 13/20* | (2006.01) |
| *B60T 7/06* | (2006.01) |
| *B60T 8/00* | (2006.01) |
| *B60T 13/74* | (2006.01) |
| *B60T 8/48* | (2006.01) |

(52) U.S. Cl.
CPC .................. *B60T 17/22* (2013.01); *B60T 7/06* (2013.01); *B60T 8/00* (2013.01); *B60T 13/20* (2013.01); *B60T 13/741* (2013.01); *B60T 8/4872* (2013.01); *B60T 2201/12* (2013.01)

(58) Field of Classification Search
CPC .......... B60T 8/00; B60T 13/741; B60T 9/06; B60T 17/22; B60T 13/20; B60T 8/4872; B60T 2201/12
USPC ......... 188/72.4, 1.11 E, 1.11 L, 1.11 R, 72.1, 188/71.7, 156; 303/10, 155, 185
See application file for complete search history.

(56) References Cited

U.S. PATENT DOCUMENTS 5,957,246 A * 9/1999 Suzuki ..................... 188/72.1
6,464,308 B2 * 10/2002 Kubota ....................... 303/20

(Continued)

FOREIGN PATENT DOCUMENTS

| CN | 101559765 A | 10/2009 |
| JP | 09137841 A * | 5/1997 |
| JP | 2002213507 A * | 7/2002 |

OTHER PUBLICATIONS

Machine Translation in English for JP 9-137841A; Inventor: Murata; 4 pages; Retrieve Date: Dec. 22, 2015.*

(Continued)

*Primary Examiner* — Thomas J Williams
*Assistant Examiner* — Mariano Sy
(74) *Attorney, Agent, or Firm* — Lorenz & Kopf, LLP

(57) ABSTRACT

Systems and methods for reducing transient brake caliper drag in a motor vehicle are provided. The motor vehicle, for example, may include, but is not limited to, an axle, a rotor coupled to the axle, a brake caliper comprising a brake pad configured to engage the rotor, a brake pedal assembly communicatively coupled to the brake caliper, the brake pedal assembly configured to receive user input directing the brake pad to apply a force to the rotor and user input directing the brake pad to disengage the rotor, and a processor coupled to the brake caliper, wherein the processor is configured to determine, after the brake pedal assembly receives user input directing the brake pad to disengage the rotor, the force applied to the rotor, and command the brake caliper to retract the brake pad away from the rotor when the determined force exceeds a predetermined threshold.

14 Claims, 3 Drawing Sheets

(56) References Cited

U.S. PATENT DOCUMENTS

| | | | |
|---|---|---|---|
| 6,845,851 B1 * | 1/2005 | Donaldson et al. | 188/3 H |
| 6,969,126 B2 * | 11/2005 | Ichinose | B60T 7/042 188/1.11 E |
| 8,620,547 B2 * | 12/2013 | Monsere et al. | 701/70 |
| 2003/0062228 A1 | 4/2003 | Ichinose et al. | |
| 2004/0201273 A1 * | 10/2004 | Kamiya et al. | 303/155 |
| 2007/0052289 A1 * | 3/2007 | Nilsson et al. | 303/20 |
| 2008/0265663 A1 | 10/2008 | Leach et al. | |
| 2009/0183958 A1 * | 7/2009 | Sano et al. | 188/204 R |
| 2011/0015845 A1 | 1/2011 | Monsere et al. | |

OTHER PUBLICATIONS

State Intellectual Property Office of the People's Republic of China, Office Action for Chinese Patent Application No. 201310757181.8 mailed Nov. 2, 2015.

* cited by examiner

SYSTEM AND METHOD FOR REDUCING TRANSIENT BRAKE CALIPER DRAG

TECHNICAL FIELD

The technical field generally relates to braking systems in motor vehicles, and more particularly relates to systems and methods for reducing transient brake caliper drag.

BACKGROUND

Fuel economy is becoming an increasingly important aspect of motor vehicles for a variety of reasons. Accordingly, systems and methods which can improve fuel economy are desirable.

SUMMARY

In one embodiment, for example, a vehicle is provided. The vehicle may include, but is not limited to, an axle, a rotor coupled to the axle, a brake caliper comprising a brake pad configured to engage the rotor, a brake pedal assembly communicatively coupled to the brake caliper, the brake pedal assembly configured to receive user input directing the brake pad to apply a force the rotor and user input directing the brake pad to disengage the rotor, and a processor coupled to the brake caliper, wherein the processor is configured to determine, after the brake pedal assembly receives user input directing the brake pad to disengage the rotor, the force applied to the rotor, and command the brake caliper to retract the brake pad away from the rotor when the determined force exceeds a predetermined threshold.

In another embodiment, for example, a method is provided for controlling a braking system of a motor vehicle, the braking system comprising a rotor and a brake caliper comprising a brake pad. The method may include, but is not limited to determining, by a processor communicatively coupled to the brake caliper, a force at which the brake pad was applied to the rotor, and commanding, by the processor, the brake caliper to retract the brake pad from the rotor when the force was greater than a predetermined threshold.

In yet another embodiment, for example, a brake system is provided. The brake system may include, but is not limited to, a rotor, a brake caliper comprising a brake pad configured to engage the rotor, a brake pedal assembly communicatively coupled to the brake caliper, the brake pedal assembly configured to receive user input directing the brake pad to engage the rotor and user input directing the brake pad to disengage the rotor, a processor coupled to the brake caliper, wherein the processor is configured to determine, after the brake pedal assembly receives user input directing the brake pad to disengage the rotor, a force applied to the rotor, and command the brake caliper to retract the brake pad away from the rotor when the determined force exceeds a predetermined threshold.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

The amount of drag experienced by a rotor (otherwise known as a brake disc) of a vehicle by a brake pad after the application of the brakes (i.e., after a user releases the brake pedal) is proportional to the force with which the brakes were applied. In other words, after the vehicle experiences a hard brake event, the amount of drag on the rotors by the brake pads is greater than after an average brake event. This can sometimes be caused by a slight repositioning of the brake pads in the direction of the rotors even after the driver of the motor vehicle completely releases the brake pedal. The drag on the rotor generally reduces over time since the rotor will push the brake pads back to a steady state position once the vehicle begins moving again. In other words, the brake pads eventually return to a nominal position where a nominal amount of drag is imparted on the rotor of the vehicle. However, the increased drag immediately following a brake negatively affects the fuel economy of the vehicle and can decrease the life cycle of the brake pads.

Figure 1:
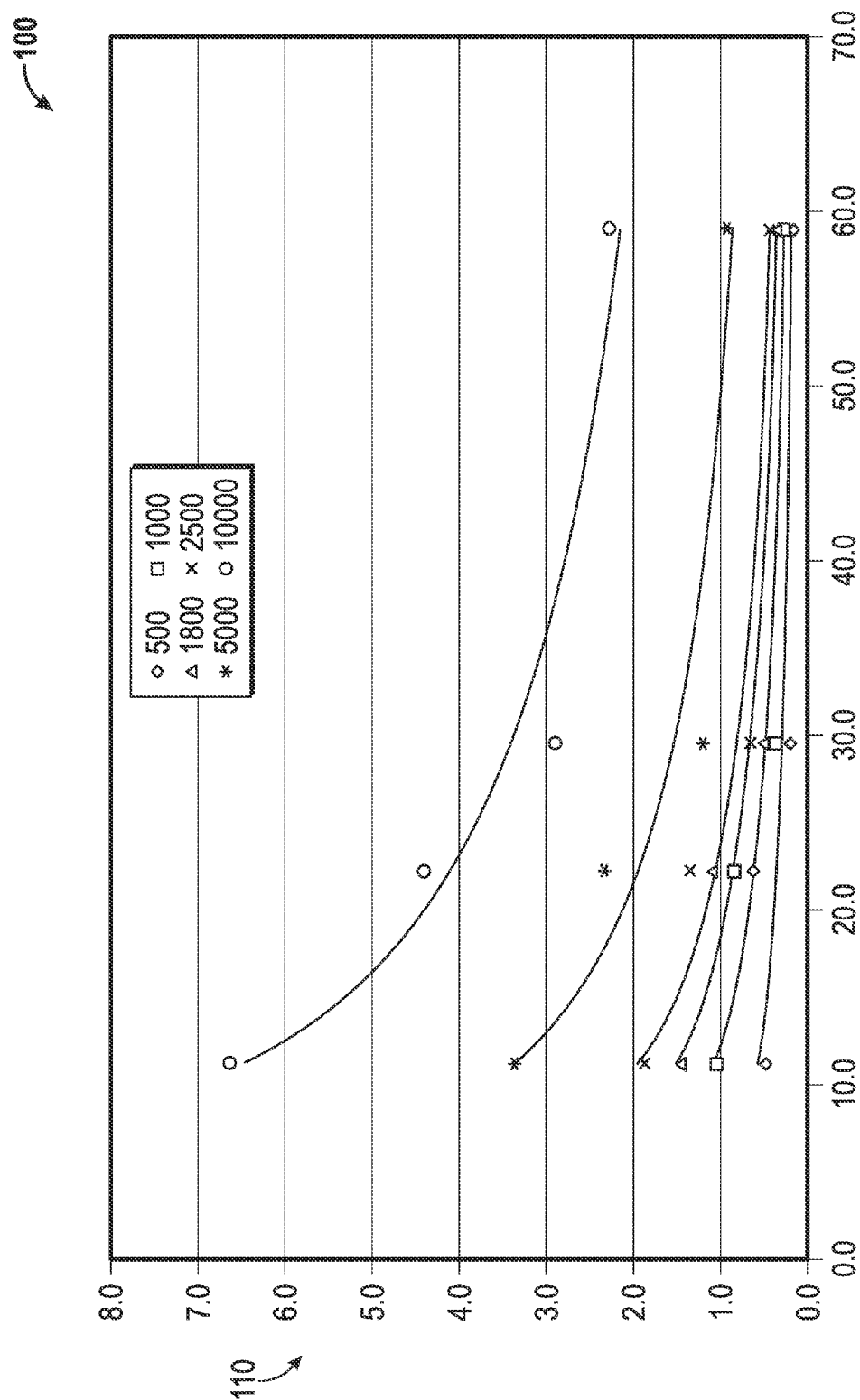
FIG. 1 is a chart illustrating the amount of drag experienced by a vehicle relative to the speed of a vehicle after six different applications of the brakes, in accordance with an embodiment.

FIG. 1 is a chart 100 illustrating the amount of drag (the vertical axis 110) experienced by a vehicle in units of Newton-meters (Nm) relative to the speed (the horizontal axis 120) of a vehicle time in seconds (s) after six different applications of the brakes in units of kilopascals (kPa). As seen in FIG. 1, a brake application with a force of ten thousand kPa causes roughly seven times more drag on the rotors than an application with a force of five hundred kPa. Furthermore, as seen in FIG. 1, the drag on the rotors, and thus the position of the brake pad within the brake caliper, takes longer to return to a nominal value and position when the brake force is higher.

Figure 2:
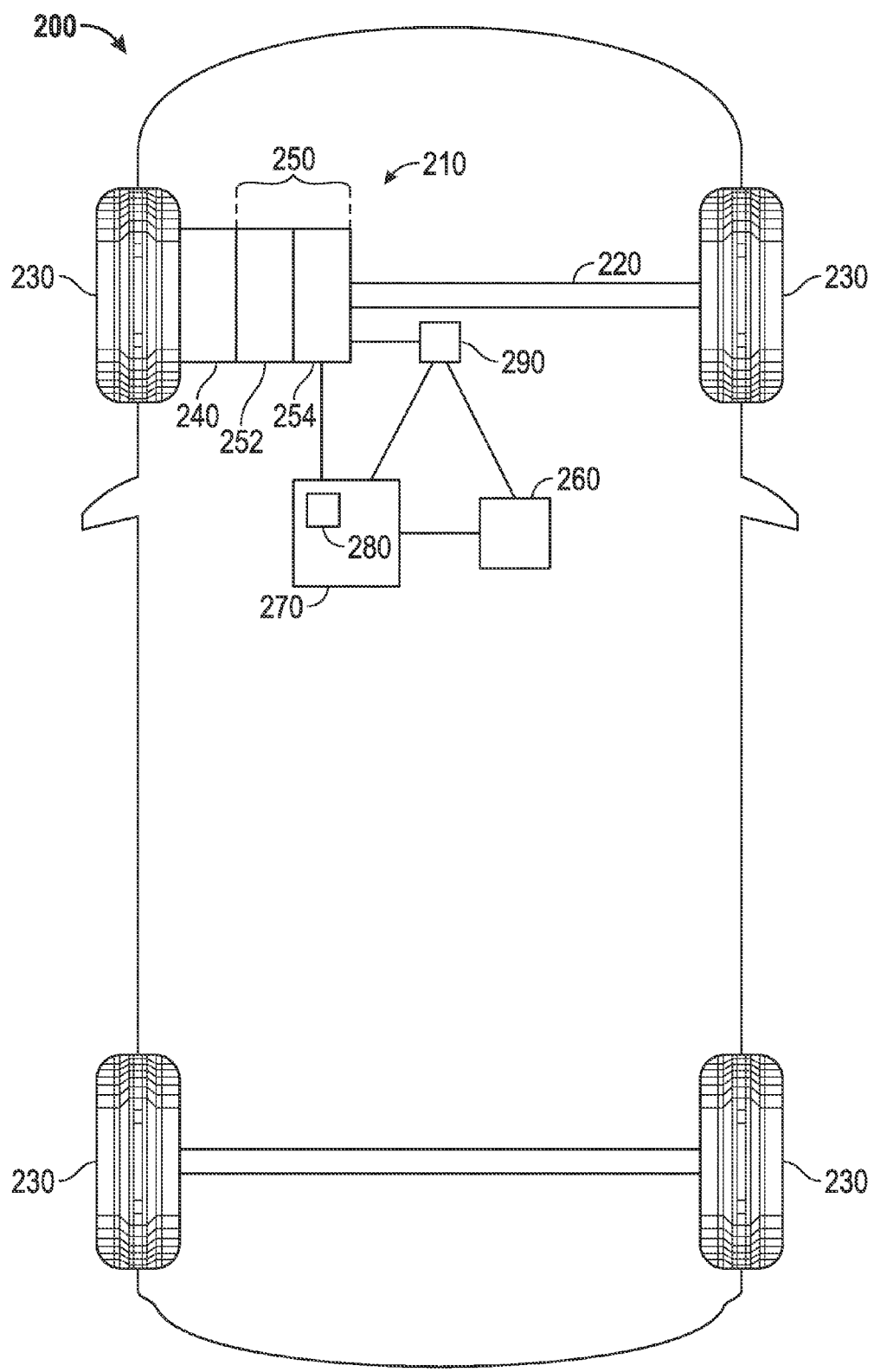
FIG. 2 is a block diagram of a vehicle including a system for reducing transient brake caliper drag, in accordance with an embodiment.

FIG. 2 is a block diagram of a vehicle 200 including a braking system 210 for reducing transient brake caliper drag, in accordance with an embodiment. The vehicle 200 includes an axle 220 coupled to at least one tire 230. The vehicle further includes at least one rotor 240 coupled to the axle 220. While the braking system 210 is illustrated as being configured around tire 230 on one axle 220, the braking system 210 may be coupled to any number of axles in the vehicle 200 and around any number of tires 230

The vehicle further includes a brake caliper 250. The brake caliper 250 includes a brake pad 252 and a system 254 for actuating the brake pad. The system 254 of actuating the brake pad 252 may be hydraulic, electronic, pneumatic, or electro-mechanic. A hydraulic system 254, for example, generally includes a hydraulic piston coupled to a pump or a linear actuator via a hydraulic line. The hydraulic piston is coupled to the brake pad 252. When the brakes need to be applied, the pump or linear actuator increases the pressure in the hydraulic line to move the piston and thus apply the brake pad 252 to the rotor 240. An electronic system 254, for example, generally includes an electronic motor coupled a piston. When the brakes need to be applied, the electronic motor advances the position of the piston.

The vehicle further includes a brake pedal assembly 260. The brake pedal assembly 260 is coupled to a brake control unit 270. In one embodiment, for example, the brake control unit 270 may be an anti-lock brake module. The brake control unit 270 controls the brake caliper 250 to control the application of the brakes based upon input from a user via the brake pedal assembly 260. The brake control unit 270 also controls a retraction of the brake pads 252, as discussed in further detail below.

The vehicle further includes a processor 280. The processor 280 may be a central processing unit (CPU), an application specific integrated circuit (ASIC), a field programmable gate array (FPGA), a microcontroller, a programmable logic controller (PLC) or any other type of logic device, or combination thereof. In one embodiment, for example, the processor 280 may be part of the brake control unit 270, as illustrated in FIG. 2. However, the processor 280 may be a stand-alone processor or it may be a shared resource among one or more other systems in the vehicle 200. In one embodiment, for example, each brake caliper 250 within the vehicle 200 may have its own processor 280. In other embodiments, for example, a single processor 280 may control each brake caliper 250.

The vehicle further includes one or more sensors 290. The sensor(s) 290 are used to monitor a force and/or a rate at which the brakes were applied. In one embodiment, for example a sensor 290 may monitor a pressure in a hydraulic line. In another embodiment, for example, the sensor 290 may be an accelerometer capable of measuring a deceleration experienced by the vehicle. In yet another embodiment, for example, the sensor 290 may measure a distance the brake pedal in the brake pedal assembly 260 has traveled. In another embodiment, for example, a sensor 290 may monitor a decrease in the speed of the vehicle via one or more sensors 290 coupled to a transmission in the vehicle or to wheel bearings in the vehicle. In yet other embodiments a combination of sensors may be used to measure the force and/or a rate at which the brakes were applied. In another embodiment, for example, a sensor 290 may monitor a position of the brake caliper 250, as discussed in further detail below.

Figure 3:
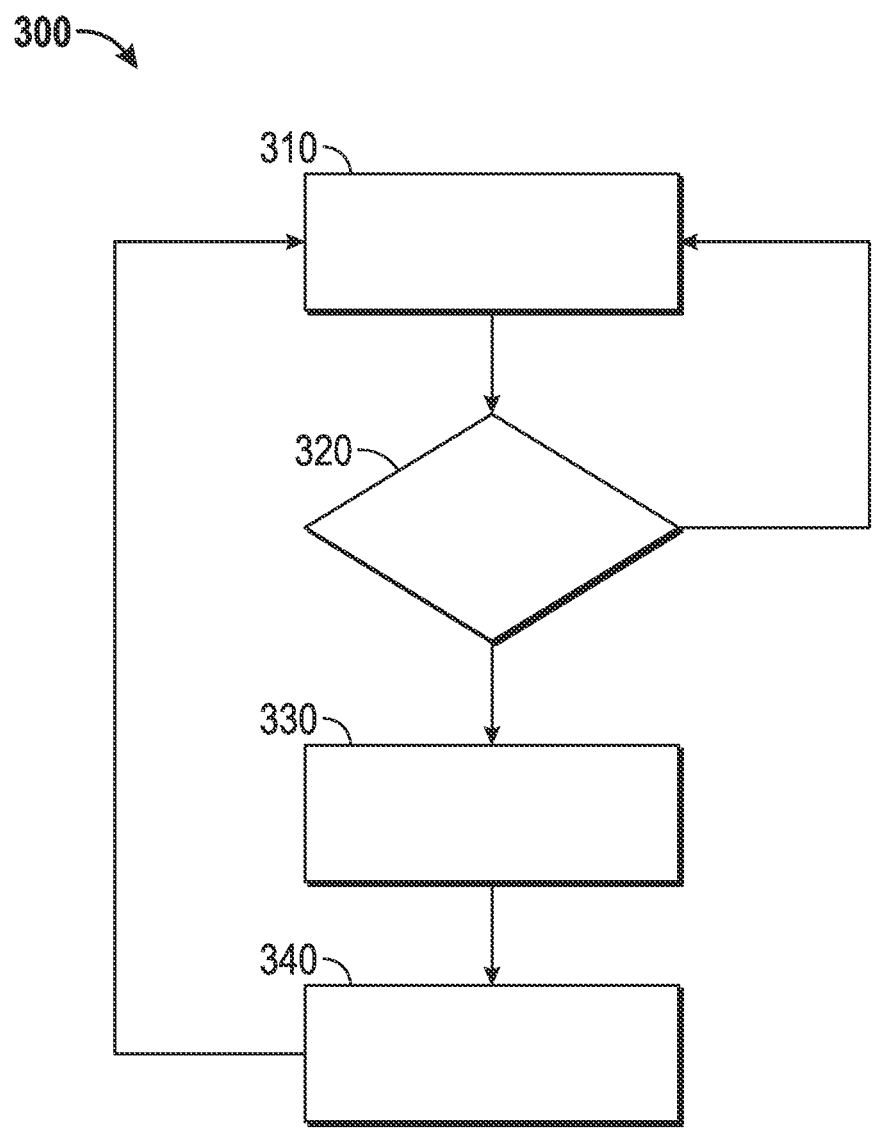
FIG. 3 is a flow chart illustrating a method for mitigating transient brake caliper drag in accordance with an embodiment.

FIG. 3 is a flow chart illustrating a method 300 for mitigating transient brake caliper drag, in accordance with an embodiment. The method begins when a processor, such as the processor 280 illustrated in FIG. 2, receives data from one or more sensors, such as the sensor(s) 290 illustrated in FIG. 2. (Step 310). As discussed above, the sensor data could include a pressure in a hydraulic or pneumatic system, a deceleration force experienced by the vehicle, a distance a brake pedal travelled, a rate at which the brake pedal was depressed, a decrease in speed experienced by the vehicle, or any combination thereof.

The processor then compares the sensor data against a predetermined threshold. (Step 320). As seen in FIG. 1, the amount of drag a brake caliper imparts on a rotor after the brakes are released is proportional to the force at which the brakes were applied. Accordingly, in one embodiment, for example, the predetermined threshold can be selected such that the brake calipers are refracted after only hard stops. By retracting the brake calipers after only hard stops, the resulting drag most affecting the fuel economy of the vehicle is reduced. In other embodiments, for example, the predetermined threshold can be set at a lower level to capture medium or low force brake applications. In yet another embodiment, for example, the predetermined threshold may be set such that every application of the brakes triggers the caliper retraction, as discussed in further detail below. When multiple sensors are on the vehicle, a threshold may be assigned to each sensor. In one embodiment, for example, the processor may determine to retract the brake calipers if any of the sensor data exceeds the predetermined threshold for a respective sensor. In another embodiment, for example, the processor may determine to retract the brake calipers if the sensor data for multiple or all of the sensors exceeds the predetermined threshold for a respective sensor. If the sensor data does not exceed the predetermined threshold, the method returns to step 310 to await the next brake application.

If the sensor data exceeds the predetermined threshold, the processor determines a position of the brake pad within the brake caliper. (Step 330). As discussed above, after the application of the brakes the brake pad does not immediately return to a nominal position. Further, as illustrated in FIG. 1, the position of the brake pads shift more after a hard brake event (imparting more drag on the rotors) than after a low force brake event. Accordingly, in one embodiment, for example, the processor may estimate the position of the brake pad based upon the sensor data indicating the force and/or rate of the brake application, wherein the position of the brake pad is estimated to be closer to the rotor after a hard stop relative to a medium or low force stop. In another embodiment, for example, a sensor can measure the actual position of the brake pad relative to the rotor.

The processor then commands the brake caliper to retract the brake pad based upon the determined position. (Step 340). As discussed above, the system 210 illustrated in FIG. 2 can be implemented in any type of brake system. In a hydraulic brake system featuring a pump, for example, the processor would run the pump in reverse, relative to a pump direction which actuates the brakes, for a length of time based upon the determined position of the brake pads to return the brake pad to the nominal position. In a brake system featuring a linear actuator, the processor would determine a distance the linear actuator would have to move to return the brake pad to the nominal position. In an electronic braking system featuring a motor, the processor would determine the length of time to run the motor in reverse to return the brake pad to the nominal position. The method then returns to step 310 to await the next application of the brakes. Accordingly, by retracting the brake pads after brake application which exceed the predetermined threshold, the amount of drag on the rotor of the motor vehicle is reduced, thereby improving fuel economy.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle, comprising:
   an axle;
   a rotor coupled to the axle;

a brake caliper comprising a brake pad configured to engage the rotor;
a brake pedal assembly communicatively coupled to the brake caliper, the brake pedal assembly configured to receive user input directing the brake pad to apply a force to the rotor during a braking operation and to receive user input directing the brake pad to disengage the rotor after the braking operation; and
a processor coupled to the brake caliper, wherein the processor is configured to:
  determine the force applied to the rotor during the braking operation;
  determine, after the brake pedal assembly receives user input directing the brake pad to disengage the rotor, a position of the brake pad based upon the force applied to the rotor during the braking operation when the determined force applied to the rotor exceeds a predetermined threshold; and
  command, when the determined force applied to the rotor during the braking operation exceeds a predetermined threshold, the brake caliper to return to a nominal position a predetermined distance away from the rotor based upon the determined position of the brake pad.

2. The vehicle of claim 1, further comprising a sensor communicatively coupled to the processor, wherein the sensor is configured to monitor a force applied by the brake pad to the rotor.

3. The vehicle of claim 1, further comprising:
a piston coupled to the brake pad;
a hydraulic line coupled to the piston; and
a pump coupled to the hydraulic line,
wherein the brake pedal assembly is communicatively coupled to the pump and configured to command the pump to operate in a first direction to increase pressure in the hydraulic line to cause the piston to move the brake pad to engage the rotor.

4. The vehicle of claim 3, further comprising a sensor is configured to measure a pressure in the hydraulic line and the processor is further configured to determine a length of time to operate the pump in a second direction to reduce pressure in the hydraulic line to cause the piston to retract the brake pads from the rotor and return the brake pad to the nominal position based upon the determined position of the brake pads.

5. The vehicle of claim 2, wherein the sensor is an accelerometer configured to measure a deceleration force experienced by the vehicle.

6. The vehicle of claim 2, further comprising:
a piston coupled to the brake pad; and
a motor coupled to the piston,
wherein the brake pedal assembly is communicatively coupled to the motor and configured to command the motor to operate in a first direction to cause the piston to move the brake pad to engage the rotor, and
wherein the processor is further configured to determine a length of time to operate the motor in a second direction to cause the piston to retract the brake pads from the rotor and return the brake pad to the nominal position based upon the determined position of the brake pads.

7. The vehicle of claim 2, wherein the sensor is communicatively coupled to the brake pedal assembly and further configured to measure a distance of travel of a pedal of the brake pedal assembly, wherein the processor is further configured to determine the force applied to the rotor based upon the distance of travel of the pedal.

8. A method for controlling a braking system of a motor vehicle, the braking system comprising a rotor and a brake caliper comprising a brake pad, the method comprising:
determining, by a processor communicatively coupled to the brake caliper, a force at which the brake pad is applied to the rotor during a braking operation;
determining, by the processor, a position of the brake pad relative to the rotor based upon the determined force the brake pad applied to the rotor during the braking operation when the determined force is greater than a predetermined threshold;
commanding, by the processor, the brake caliper to return the brake pad to a nominal position a predetermined distance from the rotor when the determined force during the braking operation is greater than the predetermined threshold based upon the determined position of the brake pad.

9. The method of claim 8, wherein the motor vehicle further comprises a hydraulic line and a pump coupled to the brake caliper, the method further comprising:
determining, the force at which the brake pad is applied to the rotor based upon a pressure in the hydraulic line.

10. The method of claim 9, wherein the commanding further comprises determining, by the processor, a length of time to operate the pump to return the brake pad to the nominal position.

11. The method of claim 8, wherein the motor vehicle further comprises a brake pedal, the method further comprising determining the force at which the brake pad is applied to the rotor based upon a distance the brake pedal traveled.

12. A brake system, comprising:
a rotor;
a brake caliper comprising a brake pad configured to engage the rotor;
a brake pedal assembly communicatively coupled to the brake caliper, the brake pedal assembly configured to receive user input directing the brake pad to engage the rotor during a braking operation and user input directing the brake pad to disengage the rotor;
a processor coupled to the brake caliper, wherein the processor is configured to:
  determine a force applied to the rotor during the braking operation;
  determine, after the brake pedal assembly receives user input directing the brake pad to disengage the rotor, a position of the brake pad based upon the determined force applied to the rotor during the braking operation when the force applied to the rotor is over a predetermined threshold; and
  command the brake caliper to return the brake pad to a nominal position a predetermined distance from the rotor when the determined force during the braking operation exceeds a predetermined threshold based upon the determined position of the brake pad.

13. The brake system of claim 12, further comprising a sensor communicatively coupled to the processor, wherein the sensor is configured to monitor a force applied to the rotor by the brake pad.

14. The brake system of claim 12, further comprising:
a sensor communicatively coupled to the processor;
a piston coupled to the brake pad;
a hydraulic line coupled to the piston;
a pump coupled to the hydraulic line,
wherein the brake pedal assembly is communicatively coupled to the pump and configured to command the pump to operate in a first direction to increase pressure in the hydraulic line to cause the piston to move the brake pad to engage the rotor, the sensor is configured to measure a pressure in the hydraulic line, and the processor is further configured to determine a length of time to operate the pump in a second direction to reduce pressure in the hydraulic line to cause the piston to retract the brake pads from the rotor and return the brake pads to the nominal position based upon the determined position of the brake pads.

* * * * *